United States Patent
Cernohous et al.

(10) Patent No.: US 9,284,421 B2
(45) Date of Patent: Mar. 15, 2016

(54) THERMOPLASTIC COMPOSITIONS CONTAINING BIOBASED MATERIALS AND PROCESSES FOR FORMING AN ARTICLE THEREWITH

(71) Applicant: GS Cleantech Corporation, Alpharetta, GA (US)

(72) Inventors: Jeffrey J. Cernohous, Hudson, WI (US); David J. Winsness, Alpharetta, GA (US)

(73) Assignee: GS CLEANTECH CORPORATION, Alpharetta, GA (US)

( * ) Notice: Subject to any disclaimer, the term of this patent is extended or adjusted under 35 U.S.C. 154(b) by 18 days.

(21) Appl. No.: 14/460,831

(22) Filed: Aug. 15, 2014

(65) Prior Publication Data

US 2015/0048534 A1   Feb. 19, 2015

Related U.S. Application Data

(60) Provisional application No. 61/866,139, filed on Aug. 15, 2013.

(51) Int. Cl.
| | | |
|---|---|---|
| *C08L 89/04* | (2006.01) | |
| *C08K 11/00* | (2006.01) | |
| *B29C 45/00* | (2006.01) | |
| *C12F 3/00* | (2006.01) | |
| *C08J 3/22* | (2006.01) | |
| *C08L 99/00* | (2006.01) | |
| *B29K 23/00* | (2006.01) | |
| *B29K 67/00* | (2006.01) | |
| *B29K 105/00* | (2006.01) | |
| *B29K 105/26* | (2006.01) | |

(52) U.S. Cl.
CPC ............... *C08J 3/22* (2013.01); *B29C 45/0001* (2013.01); *C08K 11/00* (2013.01); *C08L 89/04* (2013.01); *C08L 99/00* (2013.01); *B29K 2023/06* (2013.01); *B29K 2023/12* (2013.01); *B29K 2067/046* (2013.01); *B29K 2105/0005* (2013.01); *B29K 2105/26* (2013.01); *C08J 2323/06* (2013.01); *C08J 2323/12* (2013.01); *C08J 2367/04* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 5,593,625 A * | 1/1997 | Riebel .................... | C08L 97/02 156/328 |
| 7,937,850 B2 | 5/2011 | Tate et al. | |
| 8,256,134 B2 * | 9/2012 | Rehkopf ................... | C12F 3/10 252/182.11 |
| 2005/0019545 A1 * | 1/2005 | Riebel ....................... | C08L 3/02 428/304.4 |
| 2007/0135536 A1 * | 6/2007 | Mohanty ............ | C08G 18/0895 524/47 |
| 2009/0281203 A1 * | 11/2009 | Riebel ....................... | C12F 3/10 521/44 |

FOREIGN PATENT DOCUMENTS

WO     2015023750 A1    2/2015

OTHER PUBLICATIONS

Clarizio, S.C., et al: "Tensile Strength, Elongation, Hardness, and Tensile and Flexural Moduli of PLA Filled with Glycerol-Plasticized DDGS", Journal of Polymers and the Environment; Formerly: 'Journal of Environmental Polymer Degradation', Kluwer Academic Publishers-Plenum Publishers, NE, vol. 20, No. 3, Apr. 24, 2012; pp. 638-646, XP035112042, ISSN: 1572-8900, DOI: 10.1007/S10924-012-0452-3.

International Search Report and Written Opinion, issued in International Application No. PCT/US2014/050891, dated Dec. 17, 2014; 10 pages.

Nima Zarrinbakhsh, et al: "Biodegradable Green Composites from Distiller's Dried Grains with Solubles (DDGS) and a Polyhydroxy (butyrate-co-valerate) (PHBV)-Based Bioplastic", Macromolecular Materials and Engineering, vol. 296, No. 11, Nov. 10, 2011, pp. 1035-1045, XP55066377, ISSN: 1438-7492, DOI: 10.1002/MAME.201100039.

Yonghui Li, et al: "Mechanical and Thermal Properties of Biocomposites from Poly(lactic acid) and DDGS", Journal of Applied Polymer Science, vol. 121, No. 1, Jul. 5, 2011, pp. 589-597, XP55066376, ISSN: 0021-8995, DOI: 10.1002/app.33681 pp. 592-596.

\* cited by examiner

*Primary Examiner* — Kara Boyle
(74) *Attorney, Agent, or Firm* — Cantor Colburn LLP

(57) ABSTRACT

A masterbatch of dried distillers solubles and at least one thermoplastic resin and processes for forming the masterbatch, wherein the dried distillers solubles is greater than 70% by weight of the masterbatch are generally disclosed. The masterbatch generally includes compounding a mixture of dried distillers solubles and at least one thermoplastic resin to form a flowable solid medium, wherein the dried distillers solubles is greater than 70% by weight percent based on a total weight of the mixture and has a moisture content of less than 25% by weight of the dried distillers solubles. The article can then be formed by melt processing, direct injection molding or extruding the flowable solid medium (masterbatch) with an additional amount of at least one thermoplastic resin to form the article, wherein the article comprises dried distillers solubles in an amount of less than 50 weight percent based on a total weight of the article.

28 Claims, No Drawings

THERMOPLASTIC COMPOSITIONS CONTAINING BIOBASED MATERIALS AND PROCESSES FOR FORMING AN ARTICLE THEREWITH

CROSS REFERENCE TO RELATED APPLICATIONS

The present application claims the benefit of U.S. Provisional Application No. 61/866,139 filed on Aug. 15, 2013, incorporated herein by reference in its entirety.

BACKGROUND

The present disclosure generally relates to thermoplastic compositions containing biobased materials, and more particularly, to thermoplastic compositions including one or more thermoplastic resins and dried distillers solubles to form a melt processed, injection molded, or extruded article and processes of manufacture.

Thermoplastics are polymers that become liquid when heated and return to the solid state when cooled. This cycle of melting and freezing can be repeated, so that the plastic can be reshaped by heating it. There are many types of thermoplastics, some of which are presented below. They are useful for a variety of applications, including consumer goods, machine parts, medical equipment and packaging and storage materials. Biobased materials are seen as a potentially greener alternative to petroleum based plastics that are generally non-biodegradable, have devastating effects on animal and ocean life, and for the most part have an inherently toxic life cycle from production system through disposal. A tremendous amount of research is ongoing to substitute at least a portion of the thermoplastic with a biobased material.

Compounding is a process that melts one or more polymers with additives such as fillers, reinforcing materials, extenders and the like to give plastic compounds or composites with desired properties such as stiffness, flexural modulus, high deflection temperature, and the like. The feeds may be pellets, powder and/or liquids, but the plastic product is usually in pellet form, to be used in other plastic-forming processes such as extrusion and injection molding Machine size varies from tiny lab machines to relatively large extruders in the industry, running as much as 20 tons per hour, as used by various chemical companies that make the base resins.

Usually twin-screw extruders are preferred because these machines are generally known to provide better mixing at lower melt temperatures.

One of the problems with incorporating additives in a thermoplastic resin is agglomeration. The additives, if in particle form, can agglomerate due to Van Der Waal forces, for example, and in order to have a homogenous mixture, it is important to break up these agglomerates. This requires energy and is additional to the energy required for melt formation and mixing.

It would be desirable to provide processes and thermoplastic compositions including a biobased material that can be uniformly blended to form an article.

BRIEF SUMMARY

Disclosed herein are master batches of dried distillers solubles, articles formed from the masterbatch, and processes for forming the masterbatch of dried distillers solubles with at least one thermoplastic resin and the article from the masterbatch. The masterbatch composition consists of a flowable solid medium comprising dried distillers solubles and at least one thermoplastic resin, wherein the dried distillers solubles is greater than 70 weight percent based on a total weight of the mixture and has a moisture content of less than 25 percent by weight of the dried distillers solubles.

The process for forming the masterbatch of dried distillers solubles and a thermoplastic resin comprises compounding a mixture consisting essentially of dried distillers solubles and at least one thermoplastic resin to form a flowable solid medium, wherein the dried distillers solubles is greater than 70 weight percent based on a total weight of the mixture and has a moisture content of less than 25 percent by weight of the dried distillers solubles.

The process for forming the article comprises compounding a mixture consisting essentially of dried distillers solubles and at least one thermoplastic resin to form a flowable solid medium, wherein the dried distillers solubles is greater than 70 weight percent based on a total weight of the mixture; and melt processing, direct injection molding or extruding the flowable solid medium with an additional amount of at least one thermoplastic resin to form the article, wherein the article comprises dried distillers solubles in an amount of less than 50 weight percent based on a total weight of the article.

The disclosure may be understood more readily by reference to the following detailed description of the various features of the disclosure and the examples included therein.

DETAILED DESCRIPTION

The present disclosure is generally directed to directly injectable molding and extrusion compositions and processes thereof The directly injectable molding and extrusion compositions generally include dried distillers solubles and a thermoplastic resin. The processes for forming an article generally include first step of forming a masterbatch of the dried distillers solubles and a desired thermoplastic resin, wherein the dried distillers solubles is generally greater than 70 percent by weight in most embodiments, greater than 80 percent by weight in other embodiments, and greater than 90 percent by weight in still other embodiments. The masterbatch of the dried distillers solubles and the at least one thermoplastic is mixed and compounded together to form a flowable solid medium that defines the masterbatch. In one embodiment, the masterbatch can be compressed or extruded to form pellets or beads are formed via compression and/or extrusion. By use of the term "flowable" it is generally meant that pellets, granules, or the like that is suitable for use in processing equipment configured for melt processing, direct injection molding or extrusion with an additional amount of at least one thermoplastic resin to form the article. The additional amount of the at least one thermoplastic resin may be the same or different as the thermoplastic resin(s) utilized in the masterbatch provided that these materials are phase compatible. The masterbatch can then be stored and/or shipped, if desired, for further processing without loss of performance.

In a second step, the masterbatch is melt processed, extruded, or directly injection molded with a thermoplastic resin of interest to form a desired article. In the resulting article, the dried distillers solubles is generally less than about 50 weight percent in most embodiments, about 5 to about 40 weight percent in other embodiments, and about 10 to about 30 weight percent in still other embodiments. Moreover, the dried distillers solubles is uniformly dispersed within the thermoplastic resin and advantageously, can act as a plasticizer to lower the energy requirements.

A typical extrusion line, for example, can include a material feed hopper, a basic extruder, e.g., single screw or twin screw, calibration units, the haul-off, and a cutter or some sort.

The hopper holds the raw materials in either powder or granular form and continuously feeds this material into the extruder, which typically has a heated barrel containing the rotating screw. The screw transports the feed material to a die head and simultaneously the feed material is heated, mixed, pressurized and metered. In the present disclosure, the dried distillers solubles, which can be tacky to the touch, is fed into the hopper with the desired thermoplastic, wherein the mixture can be mixed as it is fed into the screw.

As used herein, the term "thermoplastic" refers to a plastic that once hardened can be melted and reset. Suitable thermoplastic resins include, but are not limited to, polycarbonate, polycarbonate blends such as polycarbonate-acrylobutryonitrile, polyphenylene ethers, polylactic acid, polyphenylene ether blends such as polyphenylene ether/polystyrene, polyolefins such as polyethylene and polypropylene, polyethersulfones, polyethylene terephthalate, polymethyl methacrylate, polyoxymethylene, acrylonitrile-butadiene-styrene terpolymers, acrylic-styrene-acrylonitrile terpolymers, cellulose acetate, polyamide, polyaryletherketone, polybutylene terephthalate, polyphenylene sulfide, polystyrene, polyvinyl chloride, styrene-acrylonitrile, styrene-butadiene, urethanes, and the like.

As used herein, the term dried distiller's solubles (DDS) generally refers to a byproduct of the corn-to-ethanol fermentation process such as the dry milling process, and more particularly, the soluble portion of whole stillage in dried form Using the dry milling process as an exemplary corn-to-ethanol fermentation process, corn is first screened and ground to a flour. The resulting flour is combined with water and the starch within the corn is conventionally hydrolyzed into sugar by liquefaction and saccharification. The mixture is then fermented with yeast to convert the sugar into ethanol and carbon dioxide. About 30% of the mass of each kernel of corn accepted by corn ethanol producers is converted into ethanol in this manner. The output of fermentation, a mixture of ethanol, water, protein, carbohydrates, fat, minerals, solids, and other unfermented components, is then distilled to boil off ethanol for recovery, purification and sale, leaving the remainder of the mixture in the bottom of the distillation stage.

The remainder of the mixture at the bottom of the distillation stage is referred to as whole stillage (WS) and is typically subjected to a press or centrifugation process to separate the coarse solids from the liquid. The liquid fraction contains water soluble components and is commonly referred to as distillers solubles or thin stillage (TS). TS is frequently concentrated in an evaporator to become condensed distillers solubles (CDS), which is also commonly referred to as syrup or thin stillage concentrate. Drying the liquid fraction in a drier, e.g., TS and/or CDS, produces dried distillers solubles (DDS). Exemplary drying methods include processes using standard drying equipment, including, without limitation, evaporation, spray drying, vented extrusion, belt drying, and pulse combustion drying. Some methods and apparatus are described in U.S. Pat. Nos. 8,256,134 and 7,937,850, which are incorporated herein by reference in their entireties. Drying CDS would generally preserve the solubles and suspended material in CDS and may allow for storage and/or distribution. The DDS can be in the form of particles, powder, pellets, agglomerates and other forms.

In some instances, the CDS is subjected to a high temperature drying process to form the DDS, which reportedly has been used as a thermoplastic additive with a metal oxide and fiber in the preparation of extruded articles. For example, U.S. Pat. No. 8,449,986 to Riebel et al. describes various biocomposite compositions that include dried distillers solubles, metal oxide, and fiber.

In other embodiments, the DDS are subjected to a multi-step low temperature drying process to form particles and granules such as is disclosed in U.S. patent application Ser. No. 13/768,747, incorporated herein by reference in its entirety. The multi-step low temperature drying process generally includes a fluidized bed apparatus configured to heat CDS (or TS) to a temperature less than 300° F. in most embodiments, less than 250° F. in other embodiments, and less than 200° F. in still other embodiments. In one embodiment, the process generally includes spraying or conducting CDS through one or more nozzles in the fluidized bed apparatus and subjecting the resultant output to a flow of heated gases within a chamber to evaporate at least a portion of the moisture from the CDS (or TS) and form discrete particles and granules. The discrete particles and granules are then carried from the chamber by means of a fluidized bed to facilitate additional drying and/or cooling that may include additional moisture removal. The fluidized bed may include a perforated surface in fluid communication with a fluidizing medium. The fluidized bed may include a single or plurality of zones, where the first zone can introduce a heated inert fluidizing medium and additional zones may be configured to facilitate cooling of the particles and/or granules prior to discharge from the apparatus. An exemplary apparatus is provided in U.S. patent application Ser. No. 13/768,747. The perforated surface of the fluidized bed can be a fixed bed, perforated moving conveyor, a perforated vibrating bed, a vibrating perforated moving conveyor or other.

In some embodiments, it may be desirable in some applications to remove at least a portion of the oil, water and/or other constituents contained therein prior to drying to form the DDS with the desired moisture content, oil content, and/or other constituent content. For example, the DDS may be dried to provide a moisture content of less than 25 percent. The amount of oil and/or other constituents removed can be used to tailor the properties. In most embodiments, the oil content in the DDS product material is from 3 to 15% by weight although higher or lower amounts of oil may be desired in certain applications.

The drying process is configured to provide the DDS in a flowable powder and/or granular form with a moisture content of less than about 25 percent by weight in most embodiments, a moisture content of about 3 to about 20 percent by weight in other embodiments, and a moisture content of about 5 to about 12 percent by weight in still other embodiments. The resulting DDS can be a relatively tacky material. As used herein, weight percent (wt-%), percent by weight, % by weight, and the like are synonyms that refer to the concentration of a substance as the weight of that substance divided by the total weight of the composition and multiplied by 100. Unless otherwise specified, the quantity of an ingredient refers to the quantity of active ingredient.

As used herein, the term "about" modifying any amount refers to the variation in that amount encountered in real world conditions of producing materials, such as DDS additives, polymers or composite materials, e.g., in the laboratory, pilot plant or production facility. For example, an amount of an ingredient employed in a mixture when modified by "about" includes the variation and degree of care typically employed in measuring in a plant or laboratory producing a material or polymer. For example, the amount of a component of a product when modified by "about" includes the variation between batches in a plant or laboratory and the variation inherent in the analytical method. Whether or not modified by "about", the amounts include equivalents to those amounts. Any quantity stated herein and modified by "about" can also be employed in the present invention as the amount not modified by about.

In some embodiments, the DDS or CDS or TS may be pretreated by chemical modification of proteins or amino acids in the material. CDS typically has a pH of about 4. Modifications can include, for example, treating proteins in CDS with an acid, base or other agent that alters the structure of one or more of the amino acid side chains, which, in turn, alters the character of the protein and/or amino acids. For example, the high glutamine and asparagine of prolamines, particularly zein from corn, provides a means for manipulating the charge characteristics of the protein by deamidation, thereby providing a wide range of hydrophobicity. In one embodiment, deamidation involves mild acid catalyzed deamidation at a pH of about 1 at temperatures from about 25° C. to about 65° C. for a period of time sufficient to accomplish the desired level of deamidation. In some embodiments, acids that form stable dispersions and are useful within these classes include, without limitation, lactic acid, citric acid, malonic acid, phosphoric acid, fumaric acid, maleic acid, maleic anhydride, maleated propylenes, glutaric acid, transaconitic acid, acetic acid, propionic acid, sorbic acid, cysteine and glycyl glycine. In one embodiment, lactic acid in the form of polylactic acid is used. In another embodiment, maleated propylenes, such as G-3003 and G-3015 manufactured by Eastman chemicals are used.

Other examples of chemical modification include, without limitation, esterification of proteins with alcohols, e.g., fatty alcohols, and acylation of proteins with fatty anhydrides.

As noted above, the masterbatch is first formed by compounding the DDS in powder or pelletized form with one or more thermoplastic resins, wherein the DDS is greater than 70 weight percent.

The masterbatch can then be melt processed or directly injected molded or extruded with at least one thermoplastic resin to form a desired article. In one embodiment, a dispersion aid is added to the masterbatch. The function of the dispersion aid is to improve processing of the masterbatch during a subsequent extrusion or injection molding step. In particular, the dispersion aid helps alleviate melt defects that can arise from exposing the DDS to excessive heating or shear during melt processing. In one embodiment, mineral oil has been found to be a suitable dispersion aid. Non-limiting examples of other suitable dispersion aids include, aliphatic hydrocarbon oils and waxes, fatty acids and fatty acid salts, triglyceride oils, and polyoxyalkylene polymers. The dispersion aid can added to the mixture prior to melt processing, direct injection molding or extruding. The dispersion aid is generally 1 to 10 weight percent of the total weight of the DDS and thermoplastic resin(s). Advantageously, it has been found that the addition of the dispersion aid improves dispersibility of the different components thereby providing a homogenous mixture. The addition of a dispersion aid also prevents melt defects (e.g., die and screw build up) during subsequent melt processing.

The masterbatch and/or masterbatch and thermoplastic resin may further include additives. Suitable additives include, without limitation, catalysts, fibers, cross-linkers, binders, proteins, natural biopolymers, minerals, impact modifiers, thermal stabilizers, lubricants, plasticizers, organic and inorganic pigments, biocides, processing aids, flame retardants, antioxidants, antistatic agents, delustering agents, coloring agents, aromatic agents, antiaging agents, fluorescent brightening agents, ultraviolet absorbers, ultraviolet stabilizers, slip additives, chain extenders, viscosity stabilizers, emulsifiers, and other materials as is generally known in the art.

A further understanding may be obtained by reference to certain specific examples, which are provided herein for the purpose of illustration only and are not intended to be limiting unless otherwise specified.

EXAMPLES

In the following examples, master batches generally containing 85% DDS and 15% by weight of a polymer were prepared as shown in Table 1. Polylactic acid (PLA) was obtained from Natureworks, LLC under the trade name INGEO 2003D; polypropylene (PP) was obtained from Lyondell Basell Industries under the trade name Pro-fax PH350; and high density polyethylene (HDPE) was obtained from Dow Chemical Company under the trade name Dowlex IP40. Low density polyethylene was obtained from Nova Chemical Corporation under the trade name of Sclair 31E and mineral oil was obtained from Penreco Company under the trade name of Drakeol 600. Strands of the various master batches were produced using a 27 mm twin screw extruder (Americal Leistritz Extruder Corporation), 36:1 L:D, 140° C. flat temperature profile in all zones and 300 rpm screw speed. The strands were subsequently continuously air cooled on a belt and pelletized into ~2 mm×2 mm pellets.

TABLE 1

| Example | DDS (wt %) | PLA (wt %) | PP (wt %) | HDPE (wt %) | LDPE (wt %) | Mineral Oil (wt %) |
|---|---|---|---|---|---|---|
| MB1 | 85 | 15 | — | — | — | — |
| MB2 | 85 | — | 15 | — | — | — |
| MB3 | 85 | — | — | 15 | — | — |
| MB4 | 85 | — | — | — | 15 | — |
| MB5 | 85 | — | — | — | 10 | 5 |

Samples of the different master batches were then compounded with a thermoplastic resin using a 27 mm twin screw extruder (America! Leistritz Extruder Corporation), 36:1 L:D, 140° C. flat temperature profile in all zones and 300 rpm screw speed. The samples were subsequently injection molded using an Engle 85 ton molder. Barrel temperatures were 170° C. Mold temperature was 50° C. The compounded and injection molded master batches and the corresponding composition are indicated as comparative examples 1-4 in Table 2.

Other samples of the different master batches were dry mixed and directly injection molded. That is, the masterbatch and the thermoplastic were dry mixed and directly injection molded into ASTM test specimens. These directly injected molded samples and the corresponding composition are indicated as examples 1-4 in Table 2.

All samples were tested for flexural, tensile, and impact properties following ASTM D790, D638, and D256 test protocols, respectively. The results are provided in Table 3 below and show no appreciable difference in mechanical properties between compounded and non-compounded samples, thereby indicating that the DDS advantageously eliminates the need for a compounding step. In addition to eliminating the costs associated with the compound step, the overall process efficiency is markedly improved.

TABLE 2

| Example | MB1 (wt %) | MB2 (wt %) | MB3 (wt %) | MB4 (wt %) | MB5 (wt %) | PLA (wt %) | PP (wt %) | HDPE (wt %) | LDPE (wt %) |
|---|---|---|---|---|---|---|---|---|---|
| Comparative Example 1 | 30 | — | — | — | — | 70 | — | — | — |
| Comparative Example 2 | — | 30 | — | — | — | — | 70 | — | — |
| Comparative Example 3 | — | — | 30 | — | — | — | — | 70 | — |
| Comparative Example 4 | — | — | — | 20 | — | — | — | — | 80 |
| 1 | 30 | — | — | — | — | 70 | — | — | — |
| 2 | — | 30 | — | — | — | — | 70 | — | — |
| 3 | — | — | 30 | — | — | — | — | 70 | — |
| 4 | — | — | — | — | 20 | — | — | — | 80 |

TABLE 3

| Example | Flexural Modulus (MPa) | Flexural Strength (MPA) | Impact Strength Notched Izod (J/m) | Impact Strength Unnotched Izod (J/m) |
|---|---|---|---|---|
| Comparative Example 1 | 2420 | 57 | 29 | 146 |
| Comparative Example 2 | 1250 | 41 | 35 | 149 |
| Comparative Example 3 | 760 | 21 | 24 | 419 |
| 1 | 2420 | 57 | 29 | 109 |
| 2 | 1275 | 41 | 33 | 180 |
| 3 | 765 | 21 | 23 | 385 |

In comparative example 4 and example 4, cast film was produced using a 1.25" extruder (Davis Standard Corporation) fitted with an 18" wide flexible lip cast extrusion die (Cloeron Corporation) set to a 0.020" die gap. Each sample was processed at 150° C. and 50 rpm screw speed for 8 hours. In comparative example 4, 20 wt % of MB4 was dry blended with 80 wt % LDPE and extruded into film under these conditions. Die build up and melt defects were witnessed within 30 min of start up. Upon opening the die after 8 hours, extensive die build up was witnessed that was extremely difficult to clean off In example 4, 20 wt % of MB5 (which included mineral oil as a dispersion aid) was dry blended with 80 wt% LDPE and extruded into film under identical conditions as comparative example 4. In this instance, no die build up or melt defects were witnessed after 8 hours of processing. No internal die build up was witnessed after opening the die after processing.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for forming a masterbatch of dried distillers solubles and a thermoplastic resin, comprising:
   compounding a mixture consisting essentially of dried distillers solubles and at least one thermoplastic resin to form a flowable solid medium, wherein the dried distillers solubles is greater than 70 weight percent based on a total weight of the mixture and has a moisture content of less than 25 percent by weight of the dried distillers solubles.

2. The process of claim 1, wherein the compounding comprises mixing the dried distillers solubles and the at least one thermoplastic resin in a hopper, extruding the mixture at an elevated temperature and pressure effective to form strands, and cutting the strands to form pellets.

3. The process of claim 1, wherein the at least one thermoplastic resin comprises polycarbonate, polyphenylene ethers, polylactic acid, polyphenylene ether, polyolefins polyethersulfones, polyethylene terephthalate, polymethyl methacrylate, polyoxymethylene, acrylonitrile-butadiene-styrene terpolymers, acrylic-styrene-acrylonitrile terpolymers, cellulose acetate, polyamide, polyaryletherketone, polybutylene terephthalate, polyphenylene sulfide, polystyrene, polyvinyl chloride, styrene-acrylonitrile, styrene-butadiene, urethanes, blends or mixtures thereof.

4. The process of claim 1, wherein the dried distillers solubles is a byproduct of a corn-to-ethanol fermentation process.

5. The process of claim 1, wherein the dried distillers solubles has an oil content of 3 to 15 percent by weight.

6. The process of claim 1, further comprising chemically modifying amino acids in the dried distillers soluble prior to compounding.

7. The process of claim 6, wherein chemically modifying the amino acids comprises deamidation of one or more amide groups.

8. The process of claim 6, wherein chemically modifying the amino acids comprises adding an acid to condensed distillers solubles and drying the condensed distillers solubles to produce the dried distillers solubles.

9. The process of claim 6, wherein chemically modifying the amino acids comprises adding a base to condensed distillers solubles and drying the condensed distillers solubles to produce the dried distillers solubles.

10. The process of claim 6, wherein chemically modifying the amino acids comprises esterifying the amino acids with an alcohol.

11. The process of claim 6, wherein chemically modifying the amino acids comprises acylating the amino acids with an anhydride.

12. A process for forming an article, comprising:
   compounding a mixture consisting essentially of dried distillers solubles and at least one thermoplastic resin to form a flowable solid medium, wherein the dried distillers solubles is greater than 70 weight percent based on a total weight of the mixture; and
   melt processing, direct injection molding or extruding the flowable solid medium with an additional amount of at least one thermoplastic resin to form the article, wherein the article comprises dried distillers solubles in an amount of less than 50 weight percent based on a total weight of the article.

13. The process of claim 12, wherein melt processing, direct injection molding or extruding the flowable solid medium and the additional amount of the at least one thermoplastic resin to form the article further comprises adding a dispersion aid prior to or during the melt processing, direct injection molding or extruding.

14. The process of claim 13, wherein the dispersion aid comprises aliphatic hydrocarbon oils and waxes, fatty acids and fatty acid salts, triglyceride oils, and polyoxyalkylene polymers.

15. The process of claim 13, wherein the dispersion aid is mineral oil.

16. The process of claim 13, wherein the dispersion aid is 1 to 10 weight percent of the flowable solid medium.

17. The process of claim 12, wherein the dried distillers solubles in the flowable solid medium is greater than 80 weight percent based on a total weight of the mixture.

18. The process of claim 12, wherein the dried distillers solubles in the flowable solid medium is greater than 90 weight percent based on a total weight of the mixture.

19. The process of claim 12, wherein the dried distillers solubles has a moisture content of less than 25 weight percent.

20. The process of claim 12, wherein the dried distillers solubles has a moisture content of 3 to 20 percent by weight.

21. The process of claim 12, wherein the dried distillers solubles has a moisture content of 5 to 12 percent by weight.

22. The process of claim 12, wherein the dried distillers solubles has an oil content of 3 to 15 percent by weight.

23. The process of claim 12, wherein the dried distillers solubles is a byproduct of a corn-to-ethanol fermentation process.

24. A masterbatch composition consisting essentially of:
a flowable solid medium comprising dried distillers solubles and at least one thermoplastic resin, wherein the dried distillers solubles is greater than 70 weight percent based on a total weight of the mixture and has a moisture content of less than 25 percent by weight of the dried distillers solubles.

25. An article formed from the masterbatch of claim 24 and an additional amount of at least one thermoplastic resin, wherein the article comprises dried distillers solubles in an amount of less than 50 weight percent based on a total weight of the article.

26. The article of claim 25, wherein the at least one thermoplastic resin in the masterbatch composition and the additional amount of the at least one thermoplastic resin are the same.

27. The article of claim 25, wherein the at least one thermoplastic resin in the masterbatch composition and the additional amount of the at least one thermoplastic resin are different.

28. The masterbatch of claim 25, wherein the at least one thermoplastic resin comprises polycarbonate, polyphenylene ethers, polylactic acid, polyphenylene ether, polyolefins polyethersulfones, polyethylene terephthalate, polymethyl methacrylate, polyoxymethylene, acrylonitrile-butadiene-styrene terpolymers, acrylic-styrene-acrylonitrile terpolymers, cellulose acetate, polyamide, polyaryletherketone, polybutylene terephthalate, polyphenylene sulfide, polystyrene, polyvinyl chloride, styrene-acrylonitrile, styrene-butadiene, urethanes, blends or mixtures thereof.

\* \* \* \* \*